(No Model.)
R. M. CAIN.
OVEN FOR GAS, OIL, OR VAPOR STOVES.
No. 322,418. Patented July 21, 1885.
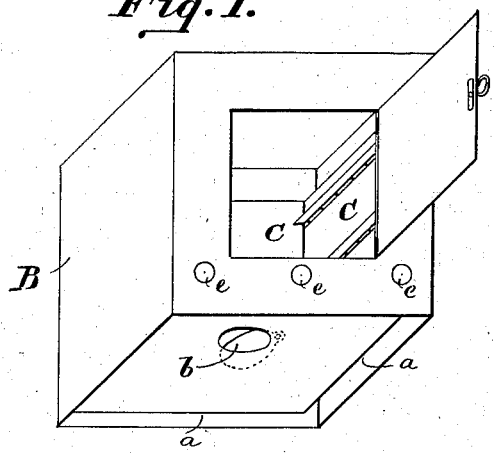
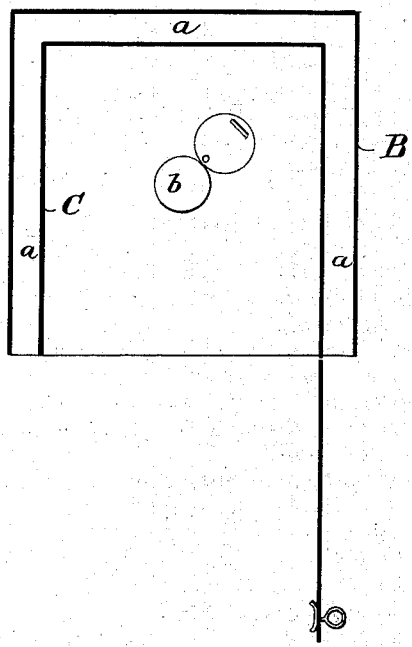
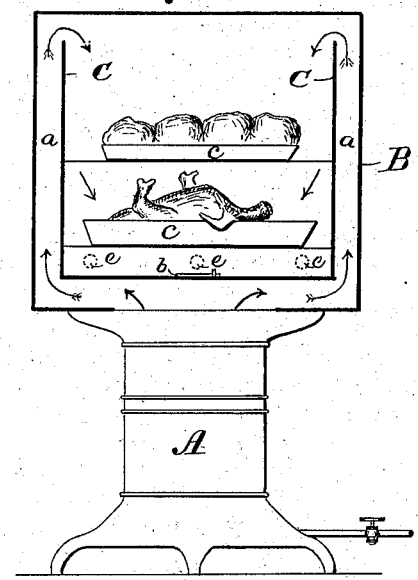
WITNESSES:
A. M. Iliff
Abram May
INVENTOR:
Robert M. Cain
BY
L. M. & R. M. Hosea
ATTORNEYS:

UNITED STATES PATENT OFFICE.

ROBERT M. CAIN, OF KOKOMO, INDIANA.

OVEN FOR GAS, OIL, OR VAPOR STOVES.

SPECIFICATION forming part of Letters Patent No. 322,418, dated July 21, 1885.

Application filed August 29, 1884. (No model.)

*To all whom it may concern:*

Be it known that I, ROBERT M. CAIN, a citizen of the United States, residing at Kokomo, Indiana, have invented new and useful Improvements in Ovens for Gas, Oil, or Vapor Stoves, of which the following is a specification.

My invention relates to improvements in ovens for gas, oil, or vapor stoves, the object being to secure a more uniform distribution of heat for cooking purposes; and it consists in the construction and arrangement of a double-walled oven in which the heated air or gases are applied, in the first instance, around the oven proper and conducted thence downward through the oven in contact with the contents.

Mechanism illustrating my invention is shown in the accompanying drawings, in which Figure 1 is a perspective view of an oven detached; Fig. 2, a sectional elevation of the oven in place, and Fig. 3 a horizontal cross-section of an oven in plan.

In the drawings, A designates the ordinary stove, and B the oven, the latter ordinarily consisting of a rectangular box open at the bottom and adapted to be placed upon the stove and receive the heated gases directly through the bottom into the interior. The obvious objection to such ovens is the want of proper distribution of the heat. This I overcome by combining with the outer casing, B, an inner casing, C, closed at the sides and bottom and open at the top, which inner casing constitutes the oven proper, the same being arranged to afford an air-space, *a*, between the casings at the sides.

It will be observed that in this construction one side of the inner casing, C, coincides with one side of the outer casing, B, and through this the access-door to the oven is arranged, the air-space *a* thus intervening between the outer and inner casings at the sides and rear only. Immediately beneath the access-door, and opening through the common wall into the inner casing, are the apertures *e*. An aperture, *b*, is arranged at the bottom of the inner casing, and provided with an adjustable closing-damper.

The operation of the device is as follows: The oven being placed upon the vapor or gas stove, the products of combustion pass at once into the outer casing through the open bottom, and are thence diverted to the sides and rear around the inner casing, C, and, passing upward, turn and enter the inner casing in a downward direction, and pass through the same to the exit openings, *e*. The heat, it will be observed, is thus uniformly distributed around the inner casing, and is imparted to the air entering with the products of combustion from the outside. The heated air is thus distributed over the contents of the inner casing uniformly. The vessel containing the article to be cooked is, however, preferably supported just above the bottom of the inner casing, and, in order that it may receive its proper quantity of heat at the bottom, the damper *b* may be opened sufficiently to allow a portion of the products of combustion rising from the stove to enter the inner casing at that point and strike directly against the bottom of the cooking-vessel. The valve covering this opening *b* may be adjusted from time to time as the operation proceeds, according to the requirements of use.

It will be seen that the outer casing is practically a reservoir of heat, in which the temperature is rendered uniform throughout by the mingling of the gases of combustion and the air entering therewith.

Having thus described and illustrated my invention, I claim and desire to secure by Letters Patent of the United States—

The portable oven for gas or oil stoves, consisting of an outer casing, B, containing an inner casing or oven, C, open at the top within the outer casing, and attached to and opening through one side thereof by a suitable door, said inner casing being provided at the bottom with an opening, *b*, and closing-register, and at the side near the bottom with openings *e* through the outer casing.

In testimony whereof I have hereunto set my hand in the presence of two subscribing witnesses.

ROBERT M. CAIN.

Witnesses:
MONTRAVILLE P. KIRKMAN,
JOHN L. CAIN.